United States Patent
Andreas-Schott et al.

(10) Patent No.: US 7,261,964 B2
(45) Date of Patent: Aug. 28, 2007

(54) FUEL CELL STACK HOUSING

(75) Inventors: Benno Andreas-Schott, Pittsford, NY (US); Joachim Lauk, Bodenheim (DE); Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/902,339

(22) Filed: Jul. 29, 2004

(65) Prior Publication Data
US 2006/0024549 A1   Feb. 2, 2006

(51) Int. Cl.
*H01M 2/02* (2006.01)
*H01M 2/08* (2006.01)

(52) U.S. Cl. .............................. 429/34; 429/12; 429/35

(58) Field of Classification Search .................... None
See application file for complete search history.

(56) References Cited

U.S. PATENT DOCUMENTS

| 5,484,666 | A | 1/1996 | Gibb et al. |
| 6,040,072 | A | 3/2000 | Murphy et al. |
| 6,057,053 | A | 5/2000 | Gibb |
| 6,218,039 | B1 * | 4/2001 | Mease et al. ................. 429/37 |
| 6,663,995 | B2 * | 12/2003 | Rock ........................... 429/34 |
| 6,936,362 | B2 * | 8/2005 | Chapman et al. ............. 429/13 |

* cited by examiner

*Primary Examiner*—John S. Maples
(74) *Attorney, Agent, or Firm*—Harness, Dickey & Pierce, P.L.C.

(57) ABSTRACT

A housing that retains a fuel cell stack includes a casing that defines a cavity. A first plate is retained within the cavity at a first end of the casing. A second plate is partially received into the cavity at a second end of the casing and is secured to the casing. The fuel cell stack is disposed between the first and second plates. The first and second plates exert a compressive force on the fuel cell stack.

14 Claims, 4 Drawing Sheets

FUEL CELL STACK HOUSING

FIELD OF THE INVENTION

The present invention relates to fuel cell stacks, and more particularly to a housing that houses a fuel cell stack.

BACKGROUND OF THE INVENTION

Fuel cell stacks typically comprise a plurality of fuel cells stacked together and held in compression with respect to each other. The plurality of fuel cells form a fuel cell stack. Typically, each fuel cell comprises an anode layer, a cathode layer and an electrolyte interposed between the anode layer and the cathode layer. The fuel cell stack requires a significant amount of compressive force to squeeze the fuel cells together. The compressive force is required to counteract internal pressure generated by reactants within the fuel cells and to maintain good electrical contact between the internal components of the fuel cells.

Traditionally, fuel cell stack housings include side plates that are connected by tension tie bars. During assembly, the side plates and fuel cell stack are pressed together to a pre-defined compression force. The side plates are fastened together using the tie bars. The compression force is relieved and the fuel cell stack relaxes as tensile force is taken up by the tie bars.

Traditional fuel cell stack housings retain specific disadvantages. Because of the post-compression relaxation, the initial compression force must be greater than that which is finally achieved after relaxation. This larger initial compression force negatively impacts on the durability of the fuel cell stack. Traditional fuel cell stack housings fail to shield electromagnetic interference (EMI) generated by the fuel cell stack. Further, traditional fuel cell stack housings do not provide a weather-tight environment, do not compensate for build tolerances between fuel cell stacks and require a significant amount of assembly components including fasteners.

SUMMARY OF THE INVENTION

Accordingly, the present invention provides a housing that retains a fuel cell stack. The housing includes a casing that defines a cavity. A first plate is retained within the cavity at a first end of the casing. A second plate is partially received into the cavity at a second end of the casing and is secured to the casing. The fuel cell stack is disposed between the first and second plates. The first and second plates exert a compressive force on the fuel cell stack.

In other features, the housing further includes a bend formed in the first end of the casing. The first plate is retained between the bend and the fuel cell stack. The bend includes first and second curves that prohibit propagation of electromagnetic interference (EMI) external to the housing.

In another feature, the housing further includes a seal disposed between the first plate and said casing.

In still other features, the housing further includes a seal disposed between the second plate and the casing. The seal is made of an EMI shielding material to prohibit propagation of EMI to an exterior of the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
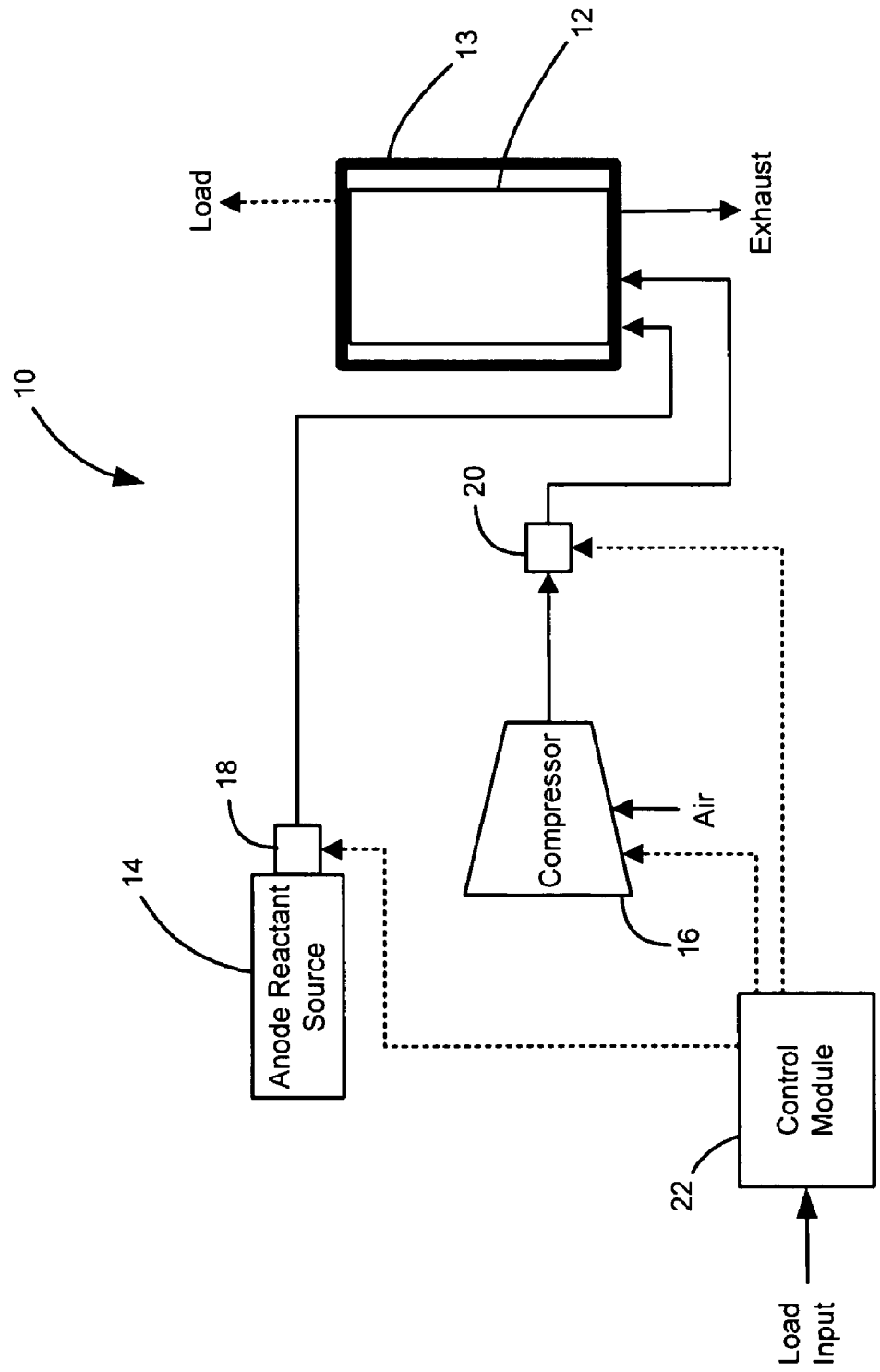
FIG. 1 is a schematic illustration of an exemplary fuel cell system.

Referring now to FIG. 1, an exemplary fuel cell system 10 is illustrated. The fuel cell system 10 includes a fuel cell stack 12 enclosed within a housing 13, a hydrogen storage system 14 and a compressor 16. The hydrogen storage system 14 includes a supply system 18, which regulates a hydrogen flow to an anode side of the fuel cell stack 12. The compressor 16 provides pressurized, oxygen-rich air to a cathode side of the fuel cell stack 12 through a regulator 20. Reactions between the hydrogen and oxygen within the fuel cell stack 12 generate electrical energy that is used to drive a load (not shown). A control module 22 regulates overall operation of the fuel cell system 10 based on a load input and operating parameters of the fuel cell system 10. The load input indicates the desired electrical energy output from the fuel cell stack 12. For example, in the case of a vehicle, the load input could include a throttle.

Figure 2:
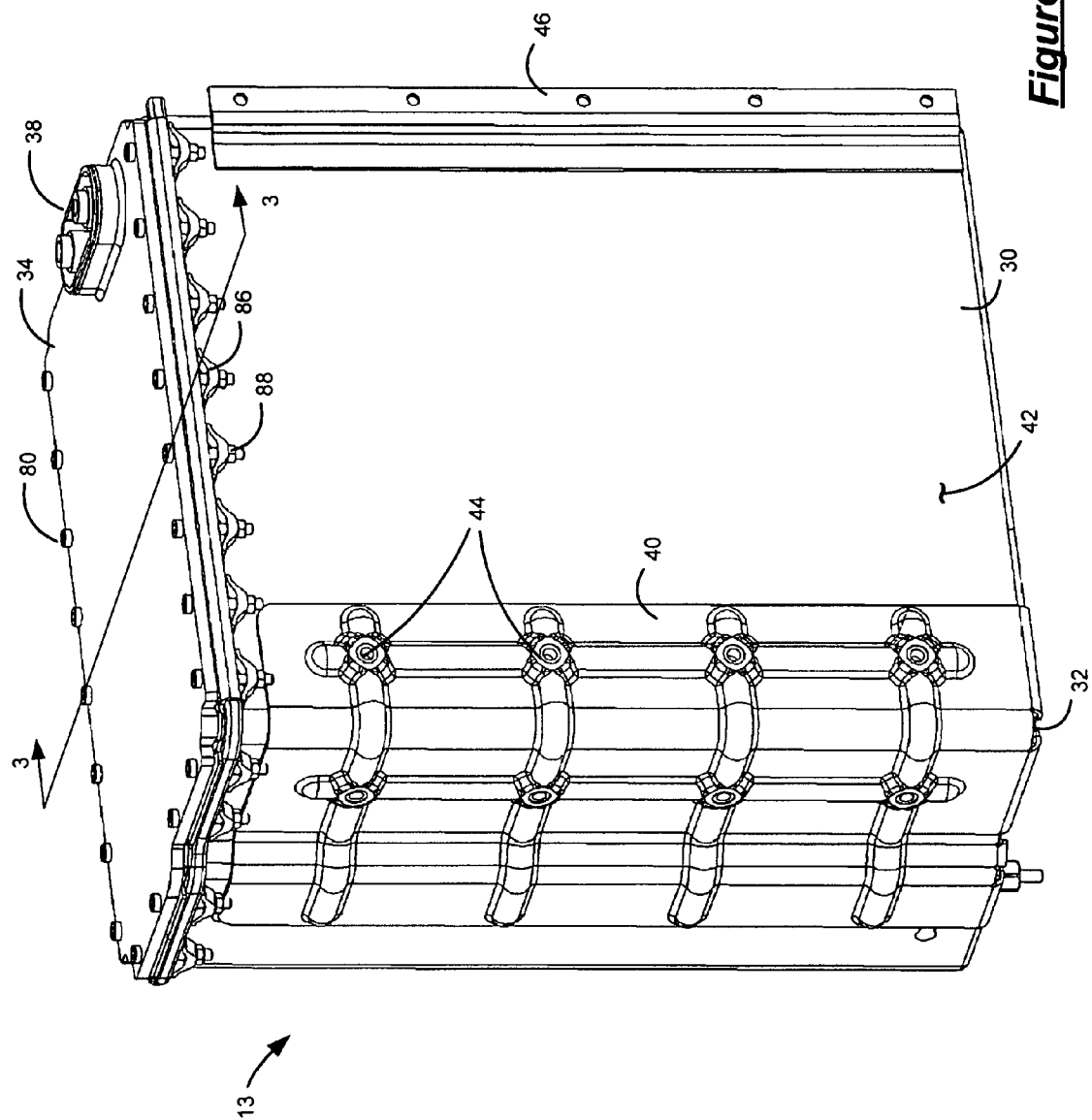
FIG. 2 is a perspective view of a fuel cell stack housing according to the present invention.
Figure 3:
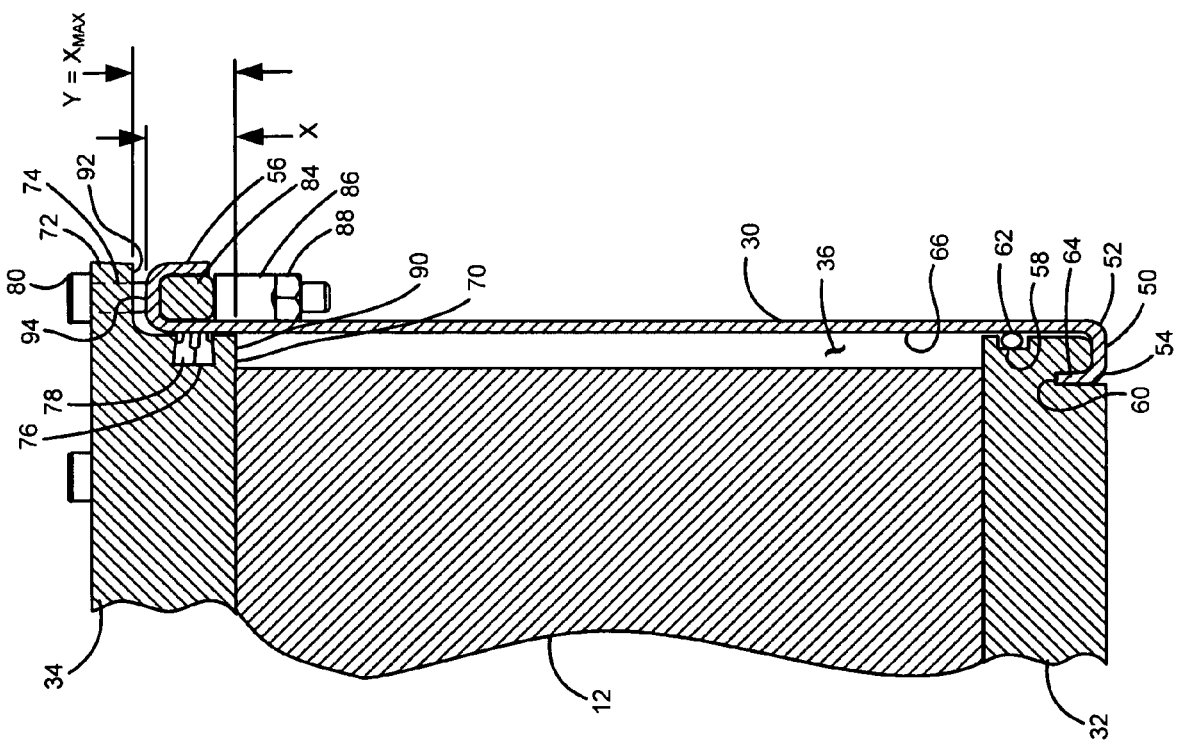
FIG. 3 is a cross-sectional view of a portion of the fuel cell stack housing taken along line 3-3 of FIG. 2.

Referring now to FIGS. 2 and 3, the housing 13 includes a casing 30, a first plate 32 and a second plate 34. The first plate 32 is retained within a bottom end of the casing 30 and the second plate 34 is bolted to a top end of the casing 30 to provide an environmentally seated cavity 36, as explained in further detail below. As seen in FIGS. 2 and 3, the top and bottom ends of casing 30 form first and second free ends thereof. The casing 30, first plate 32 and second plate 34 are each formed from a material that provides shielding from electromagnetic interference (EMI). In a preferred embodiment, each of these components is made of a metal. In a more preferred embodiment, the first and second plates 32, 34 are made of aluminum (Al) and the casing 30 is made of stainless steel.

An electrical connector 38 is formed in the second plate 34. The electrical connector 38 enables electrical communication between the fuel cell stack 12 and the load. Although not illustrated, additional connectors are provided that enable the transfer of reactants (e.g., hydrogen and oxygen), coolant and exhaust products to and from the fuel cell stack 12 through the housing 13. The additional connectors can be formed through the first plate 32. An exemplary mounting bracket 40 is bonded to an exterior surface 42 of the casing 30. The mounting bracket 40 includes a plurality of threaded apertures 44 that receive fasteners (not shown) to secure the housing 13 to a support structure (e.g., vehicle frame). An exemplary connecting bracket 46 enables multiple housings 13 to be secured together in the case where the fuel cell system 10 implements multiple fuel cell stacks 12.

Figure 4:
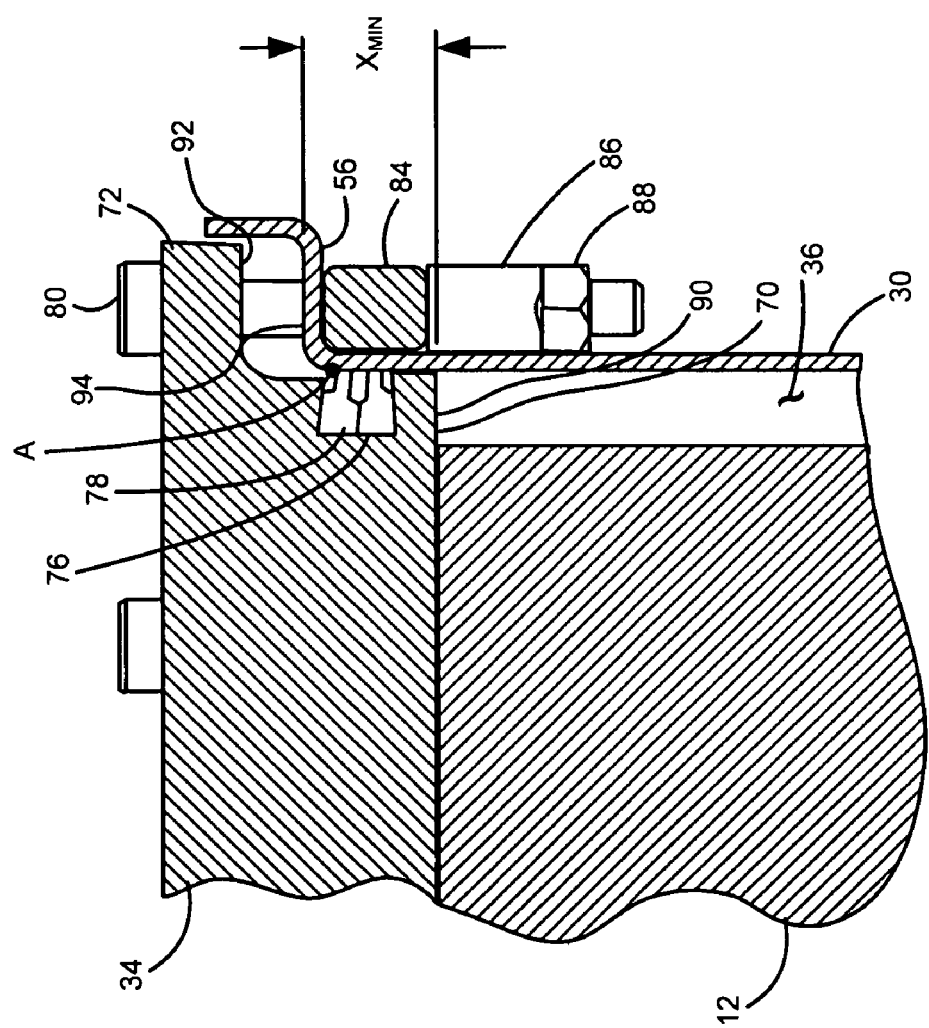
FIG. 4 is a more detailed view of FIG. 3 illustrating an alternative geometry formed in said fuel cell stack housing.

With particular reference to FIG. 3, the casing 30 includes a geometry or J-shaped bend 50 formed in the bottom free end. The J-shaped bend 50 is formed towards the interior of the casing 30 and includes first and second curves 52, 54. Another J-shaped bend 56 is formed at a top free end of the casing 30 towards an exterior of the casing 30. It is anticipated, however, that the bend 56 formed at the top free end of the casing 30 can include an S-shaped bend, as illustrated in FIG. 4.

The first plate 32 includes a seal seat 58 and a retention recess 60. A seal 62 is retained within the seal seat 58. During assembly, the first plate 32 is slidably received within the casing 30 and is slid down to the bottom end of the casing 30. A free end 64 of the J-shaped bend is received into the retention recess 60, holding the first plate 32 and preventing the first plate 32 from sliding out of the casing 30. The seal 62 seats against an interior surface 66 of the casing 30 and seals the interior cavity 36 from the external environment. In this manner, water, dirt, debris and the like are prevented from entering the interior cavity 36 between the first plate 32 and the casing 30. Further, the J-shaped bend 50 not only retains the first plate 32 without the need of separate fasteners (e.g., screws, bolts), but it also provides an EMI seal. More specifically, the first and second bends 52, 54 refract EMI, preventing propagation of EMI outside of the housing 13.

The second plate 34 includes an extension 70 and an overhang 72 that runs about the perimeter of the second plate 34. Apertures 74 are formed through the overhang 72 to enable attachment of the second plate 34 to the casing 30. The extension 70 includes a seal seat 76 within which a seal 78 is retained. The seal 78 is formed from a material that provides shielding from EMI and is at least partially resilient to provide a seal between the interior surface 66 and the second plate 34. In this manner, the interior cavity 36 is sealed from the external environment and propagation of EMI outside of the housing 13 is inhibited.

The second plate 34 is assembled onto the casing 30, whereby the extension 70 is at least partially received into the cavity 36 and the overhang 72 extends out over the bend 56 at the top end of the casing 30. The second plate 34 is secured to the casing 30 by fasteners 80. The fasteners 80 are received through the apertures 74 and corresponding apertures 82 in the bend 56 of the casing 30. A spacer ring 84 is optionally provided and is disposed about the casing 30, below the bend 56. Each fastener 80 includes a leaf spring 86 and nut 88. The nut 88 is threaded onto an end of the fastener 80, securing the leaf spring 86 between the bend 56 and the nut 88 or the spacer ring 84 and the nut 88. The leaf spring 86 provides a biasing force against the nut 88 to inhibit loosening of the nut 88. Although a leaf spring is illustrated, it is also anticipated that a spring, spring washer or lock washer can be substituted therefore.

Referring now to FIGS. 3 and 4, the depth (X) to which the extension 70 is received within the cavity 36 is based on the height of the fuel cell stack 12. More specifically, similar fuel cell stacks 12 can vary in height as a result of build tolerances. Therefore, X is unique to a particular fuel cell stack 12. The maximum depth ($X_{MAX}$) is defined as the distance (Y) between a bottom surface 90 of the extension and a bottom surface 92 of the overhang 72. More specifically, X is limited as a result of the bottom surface 92 of the overhang 72 resting on a top surface 94 of the bend 56. The minimum depth ($X_{MIN}$) is defined as the distance between the top surface 94 of the bend 56 and the bottom surface 90 of the extension 70, at the uppermost point (A) along the interior surface 66 of the casing 30 where the seal 78 is able to sufficiently seal the interior cavity 36. Because X can vary between $X_{MAX}$ and $X_{MIN}$, the housing 13 of the present invention is flexible to compensate for variable height fuel cell stacks 12.

When assembling the fuel cell stack 12 into the housing 13, the fuel cell stack 12 is received into the interior cavity 36 that is defined by the first plate 32 and the casing 30. The second plate 34 is assembled onto the casing 30, whereby the fuel cell stack 12 is disposed between the first and second plates 32, 34. A linear force is applied to the second plate 34 to induce a desired compressive force on the fuel cell stack 12. The linear force can be applied by a mechanical means including a press or clamp. The fasteners 80 are assembled onto the housing 13 to secure the second plate 34 to the casing 30. The fasteners 80 are secured to maintain the desired compressive force on the fuel cell stack 12. The linear force is relieved from the assembled housing 13.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A housing that retains a fuel cell stack, comprising:
   a casing that defines a cavity, said casing having first and second free ends, said first and second free ends each having at least two bends therein;
   a first plate that is retained within said cavity at said first free end of said casing; and
   a second plate that is partially received into said cavity at said second free end of said casing and is secured to said casing at said second free end, wherein said fuel cell stack is disposed between said first and second plates, said first and second plates exerting a compressive force on said fuel cell stack.

2. The housing of claim 1 wherein a first bend is formed in said first free end of said casing, said first plate being retained between said first bend and said fuel cell stack.

3. The housing of claim 2 wherein said first bend and a second bend formed in said first free end of said casing form first and second curves that prohibit propagation of electromagnetic interference (EMI) external to said housing.

4. The housing of claim 1 further comprising a seal disposed between said first plate and said casing.

5. The housing of claim 1 further comprising a seal disposed between said second plate and said casing.

6. The housing of claim 5 wherein said seal is made of an EMI shielding material to prohibit propagation of EMI to an exterior of said housing.

7. A protective housing for a fuel cell stack, comprising:
   a casing that defines a cavity, said casing having first and second free ends, said first and second free ends each having at least two bends therein, said first free end having a geometry that extends into said cavity;
   a first plate that is retained within said cavity and engages said geometry; and
   a second plate that is partially received into said cavity at said second free end of said casing and is secured to said casing at said second free end to exert a compressive force on said fuel cell stack.

8. The protective housing of claim 7 wherein said geometry comprises a first bend formed in said first free end of said casing, said first plate retained between said bend and said fuel cell stack.

9. The protective housing of claim 8 wherein said first bend and a second bend formed in said first free end of said casing form first and second curves that refract electromagnetic interference (EMI) generated by said fuel cell stack.

10. The protective housing of claim 7 further comprising a seal disposed between said first plate and said casing.

11. The protective housing of claim 7 further comprising a seal disposed between said second plate and said casing.

12. The protective housing of claim 11 wherein said seal is made of an EMI shielding material to prohibit propagation of EMI to an exterior of said housing.

13. The protective housing of claim 7 further comprising a plurality of fasteners that secure said second plate to said housing.

14. The protective housing of claim 13 further comprising a biasing member associated with each fastener, said biasing member exerting a resilient tensile force on said fastener to inhibit disassembly of said fastener from said protective housing.

* * * * *